US 8,046,686 B2

(12) United States Patent
Miwa

(10) Patent No.: US 8,046,686 B2
(45) Date of Patent: Oct. 25, 2011

(54) METHOD, APPARATUS AND PROGRAM FOR SETTING FUNCTION TO OPERATION CONTROL OF SIGNAL PROCESSING APPARATUS

(75) Inventor: Akihiro Miwa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 463 days.

(21) Appl. No.: 11/193,897

(22) Filed: Jul. 29, 2005

(65) Prior Publication Data

US 2006/0030957 A1 Feb. 9, 2006

(30) Foreign Application Priority Data

Aug. 3, 2004 (JP) ................. 2004-226306

(51) Int. Cl.
*G06F 3/00* (2006.01)
(52) U.S. Cl. .................. 715/716; 715/717
(58) Field of Classification Search .......... 700/83; 715/716–717, 727–728, 763
See application file for complete search history.

(56) References Cited

U.S. PATENT DOCUMENTS

| | | | | |
|---|---|---|---|---|
| 5,313,574 A | * | 5/1994 | Beethe | 715/763 |
| 5,390,138 A | * | 2/1995 | Milne et al. | 381/119 |
| 5,467,288 A | * | 11/1995 | Fasciano et al. | 715/716 |
| 5,590,271 A | | 12/1996 | Klinker | |
| 5,627,955 A | | 5/1997 | Gnirss et al. | |
| 5,883,621 A | | 3/1999 | Iwamura | |
| 5,892,507 A | | 4/1999 | Moorby et al. | |
| 5,959,610 A | * | 9/1999 | Silfvast | 345/156 |
| 6,359,632 B1 | * | 3/2002 | Eastty et al. | 715/716 |
| 6,377,962 B1 | | 4/2002 | Tindell et al. | |
| 6,421,692 B1 | * | 7/2002 | Milne et al. | 715/202 |
| 6,441,830 B1 | * | 8/2002 | Duvall et al. | 715/716 |
| 6,492,999 B1 | | 12/2002 | Fado et al. | |
| 6,640,145 B2 | * | 10/2003 | Hoffberg et al. | 700/83 |
| 6,694,198 B2 | * | 2/2004 | Takaku et al. | 700/83 |
| 6,738,964 B1 | * | 5/2004 | Zink et al. | 717/105 |
| 6,801,957 B1 | | 10/2004 | Sadanaka et al. | |
| 6,981,208 B2 | | 12/2005 | Milne et al. | |

(Continued)

FOREIGN PATENT DOCUMENTS

EP 1 117 226 A2 7/2001

(Continued)

OTHER PUBLICATIONS

Owner's Instruction Manual for DM2000, Yamaha Corporation, 2002.

(Continued)

*Primary Examiner* — Ashraf Zahr
(74) *Attorney, Agent, or Firm* — Morrison & Foerster LLP

(57) ABSTRACT

In a method of setting a function to an operation control provided in a signal processing apparatus, a display step is carried out to display a block diagram that depicts functions of the signal processing apparatus used for processing or mixing of a plurality of input signals. Then, a selection step is carried out to select a specific function out of the functions depicted in the block diagram. Thereafter, an assignment step is carried out to assign the selected specific function to an operation control of the signal processing apparatus. Practically, an operation control display step is carried out to display a plurality of operation controls of various types provided in the signal processing apparatus for selection of one operation control, so that the assignment step assigns the selected specific function to the operation control selected from the plurality of the operation controls displayed by the operation control display step.

3 Claims, 4 Drawing Sheets

U.S. PATENT DOCUMENTS

| | | |
|---|---|---|
| 2001/0021188 A1 | 9/2001 | Fujimori et al. |
| 2002/0003548 A1 | 1/2002 | Krusche et al. |
| 2002/0089531 A1 | 7/2002 | Hirasawa |
| 2002/0175931 A1 * | 11/2002 | Holtz et al. .................. 345/716 |
| 2003/0034998 A1 | 2/2003 | Kodosky et al. |
| 2003/0035006 A1 * | 2/2003 | Kodosky et al. .............. 345/763 |

FOREIGN PATENT DOCUMENTS

| | | |
|---|---|---|
| JP | 7168575 | 7/1995 |
| JP | 07-199942 A | 8/1995 |
| JP | 10-084241 A | 3/1998 |
| JP | 11-296172 A | 10/1999 |
| JP | 2001-203732 | 7/2001 |
| JP | 2003-140656 A | 5/2003 |

OTHER PUBLICATIONS

Notice of Rejection mailed Oct. 1, 2009, for JP Patent Application No. 2004-226306, with English translation, four pages.

Notice of Rejection mailed Jun. 25, 2009, for JP Patent Application No. 2004-226306, with English translation, four pages.

* cited by examiner

METHOD, APPARATUS AND PROGRAM FOR SETTING FUNCTION TO OPERATION CONTROL OF SIGNAL PROCESSING APPARATUS

BACKGROUND OF THE INVENTION

1. Technical Field

The present invention is related to an operation control function setting method, an operation control function setting apparatus, and an operation control function setting program appropriately used for audio equipment, especially a mixing apparatus.

2. Related Art

A mixing apparatus processes a plurality of input signals for the purpose of input level adjustment, equalizer adjustment, and the like, and mixes these signals. Conventionally, such a mixing apparatus is provided with many operation controls such as switches, volumes, faders, and the like that are given respective function names by means of stamps and the like. Input signals are subject to the signal processes and the mixing process based on these switches. Instruction manuals and the like include a block diagram that illustrates the relationship between these process functions and controls. Such an instruction manual is exemplified by Instruction manual for DM2000, YAMAHA CORPORATION, February 2002.

Numerous operation controls are used because there are many signal process functions. One operation control on an operation panel may be set for a plurality of circuit switches shown on the block diagram and may be differently used depending on usage situations. A beginner may feel it difficult to determine which operation controls should be used to implement an intended function.

SUMMARY OF THE INVENTION

The present invention has been made in consideration of the foregoing. It is therefore an object of the present invention to provide an operation control function setting method, an operation control function setting apparatus, and an operation control function setting program that allow users to be able to easily understand the relationship between an intended function and the corresponding operation control.

To solve this problem, the present invention has the following construction. In one aspect of the present invention, there is provided a method of setting a function to an operation control provided in a signal processing apparatus, the method comprising: a display step to display a block diagram that depicts functions of the signal processing apparatus used for processing or mixing of a plurality of input signals; a selection step to select a specific function out of the functions depicted in the block diagram; and an assignment step to assign the selected specific function to an operation control of the signal processing apparatus. Preferably, the inventive method further comprises an operation control display step to display a plurality of operation controls of various types provided in the signal processing apparatus for selection of one operation control, wherein the assignment step assigns the selected specific function to the operation control selected from the plurality of the operation controls displayed by the operation control display step.

In another aspect of the invention, there is provided a setting apparatus for assigning a function to an operation control provided in a signal processing apparatus, the setting apparatus comprising: a display section that displays a block diagram depicting functions of the signal processing apparatus used for processing or mixing of a plurality of input signals; a selection section that selects a specific function out of the functions depicted in the block diagram; and an assignment section that assigns the selected specific function to an operation control of the signal processing apparatus. Preferably, the display section further displays a plurality of operation controls of various types provided in the signal processing apparatus for selection of one operation control, and the assignment section assigns the selected specific function to the operation control selected from the plurality of the operation controls displayed in the display section.

In a further aspect of the invention, there is provided a machine readable medium for use in a signal processing apparatus having a processor for processing or mixing a plurality of input signals. The medium contains program instructions executable by the processor for causing the signal processing apparatus to perform a method of setting a function to an operation control provided in the signal processing apparatus. The method comprises: a display step to display a block diagram that depicts functions of the signal processing apparatus used for processing or mixing of the input signals; a selection step to select a specific function out of the functions depicted in the block diagram; and an assignment step to assign the selected specific function to an operation control of the signal processing apparatus. Preferably, the method further comprises an operation control display step to display a plurality of operation controls of various types provided in the signal processing apparatus for selection of one operation control, so that the assignment step assigns the selected specific function to the operation control selected from the plurality of the operation controls displayed by the operation control display step.

According to the construction of the present invention, a specific function can be selected from those depicted in a block diagram that shows functions of a signal process or a mixing process performed for a plurality of input signals. The selected function can be assigned to an operation control. Accordingly, a user can easily understand the relationship between the function and the operation control.

DETAILED DESCRIPTION OF THE INVENTION

1. Construction of an Embodiment

Figure 1:
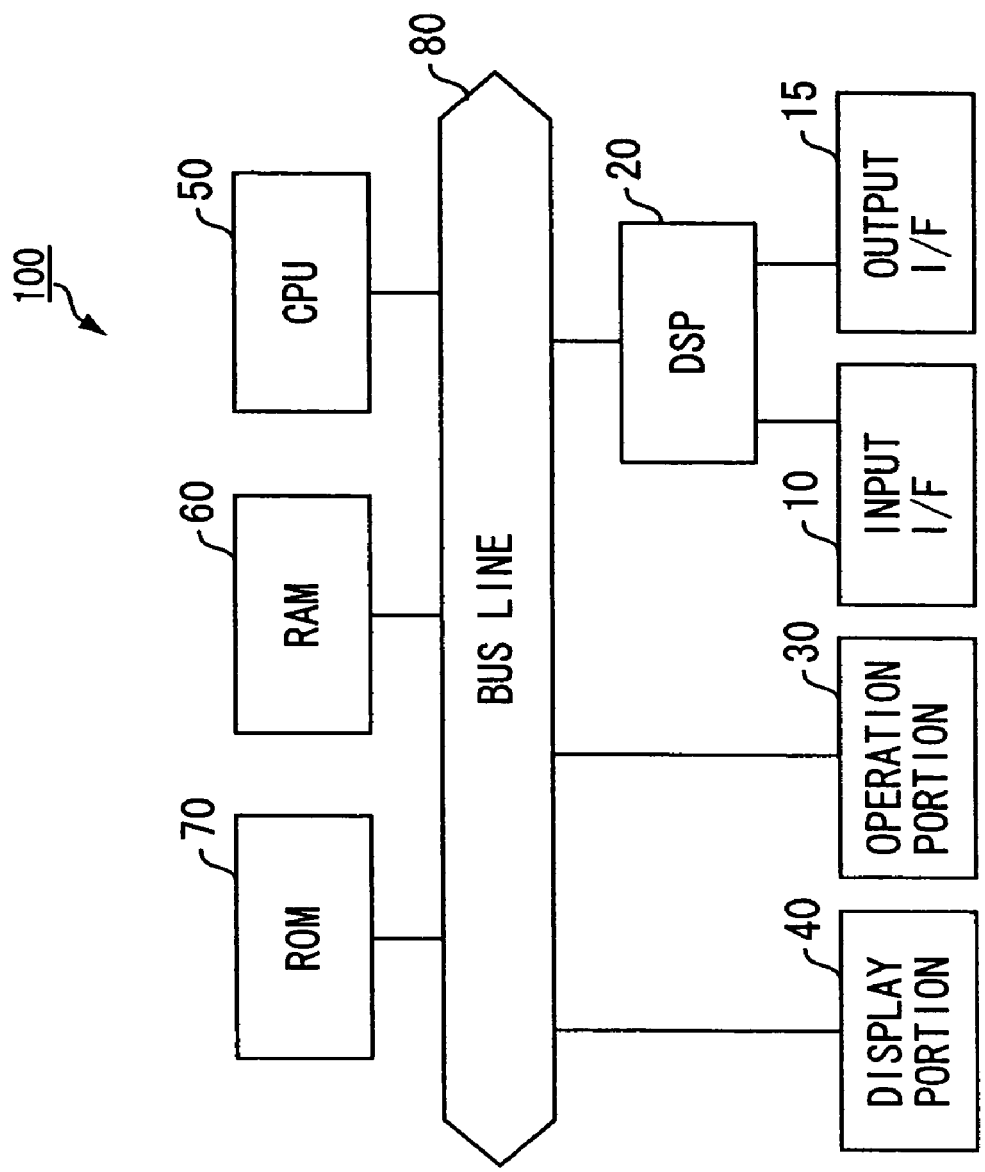
FIG. 1 is a configuration diagram showing the mixing apparatus incorporating an operation control function setting apparatus as an embodiment of the present invention.

With reference to FIG. 1, the following describes the construction of a mixing apparatus in which an operation control function setting apparatus is incorporated as an embodiment of the present invention.

In FIG. 1, reference numeral 10 denotes an input interface that is supplied with a digital audio signal or with an analog audio signal converted into a digital, audio signal. Reference numeral 15 denotes an output interface to output a digital audio signal as is or converted into an analog audio signal. There is provided a plurality of input and output terminals also compliant with stereo signals. Reference numeral 20 denotes a DSP that digitally processes input signals. Reference numeral 30 denotes an operation portion composed of a mouse, a keyboard, and a panel containing various switches and controls. The following describes the operation portion with reference to a panel's outline view in FIG. 2.

Figure 2:
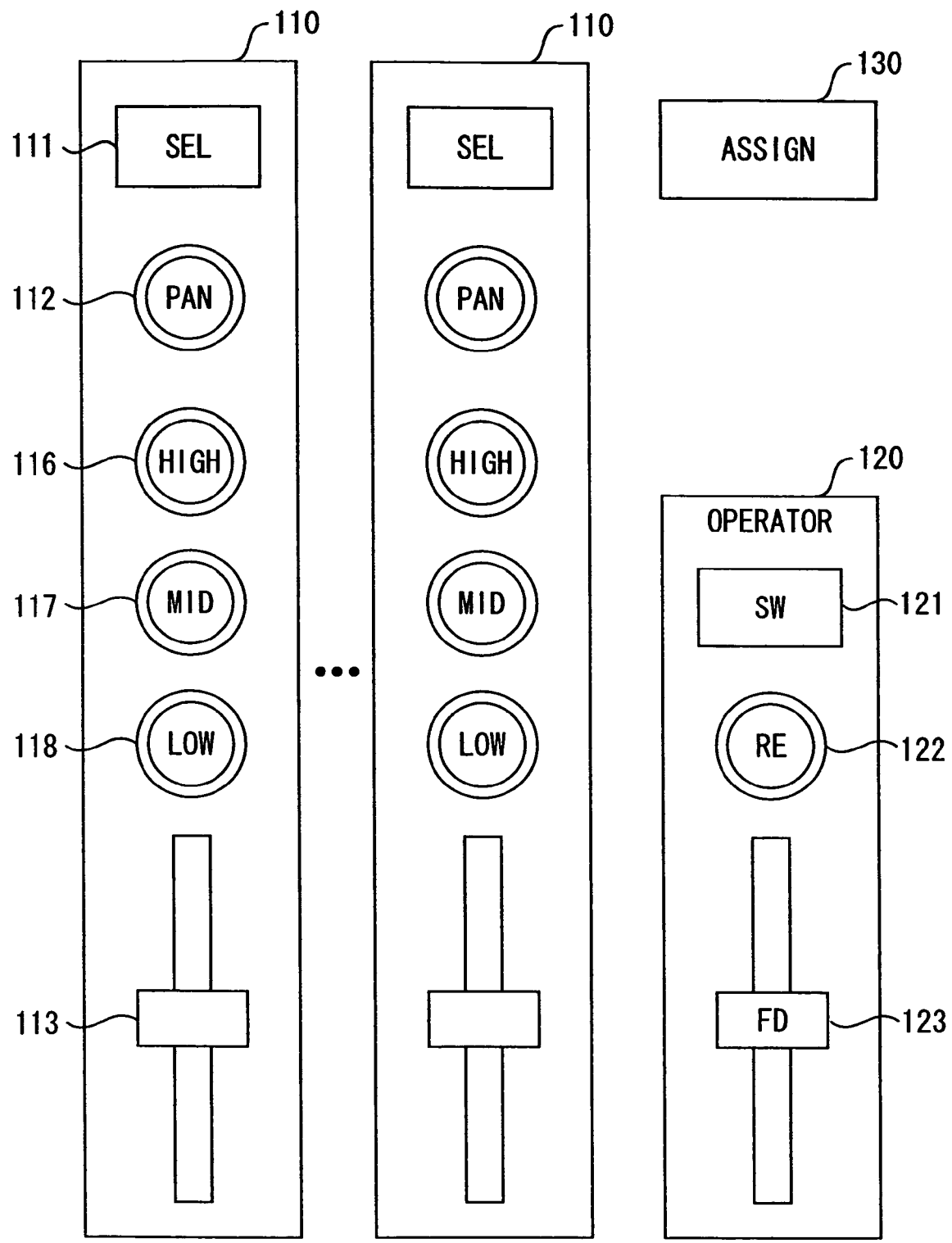
FIG. 2 is an outline view of a panel provided on the mixing apparatus as the embodiment of the present invention.

In FIG. 2, reference numeral 110 denotes a channel strip provided for each input signal. The channel strip 110 includes the following. A selector switch 111 determines whether or not each input signal should be selected for mixture. A pan operation control 112 distributes an input signal to left and right output channels. Operation controls 116, 117, and 118 for the equalizer function adjust low, middle, and high pitch frequency characteristics. A fader 113 adjusts input levels.

Reference numeral 120 denotes an operator strip provided with operation controls such as a switch 121, a rotary encoder 122, and a fader 123. These operation controls are set with functions as intended by an operator. Reference numeral 130 denotes an assign switch. Each press operation of this switch alternates normal mode and assign mode. The normal mode enables the signal process such as input level adjustment and the mixing process using the operation controls on the channel strip 110 or the operator strip 120. The assign mode displays a block diagram representing functions of the signal process and the mixing process on a display device and assigns the functions to the operation controls on the operator strip 120 as needed. In the assign mode, an assign switch 130 lights.

Referring back to FIG. 1, reference numeral 40 denotes a display portion composed of a liquid crystal panel. Reference numeral 50 denotes a CPU that controls each portion. Reference numeral 60 denotes RAM used as work memory. Reference numeral 70 denotes ROM to store a program and parameters. The ROM 70 is a machine readable medium for use in the mixing apparatus having the CPU 50 for processing or mixing a plurality of input signals. The ROM 70 contains program instructions executable by the CPU 50 for causing the mixing apparatus to perform a method of setting a function to an operation control provided in the mixing apparatus. Each portion of the mixing apparatus 100 uses a bus line 80 to interchange instructions and data. The above-mentioned constituent elements construct the mixing apparatus 100 as an example of a signal processing apparatus.

2. Operations of the Embodiment

Figure 4:
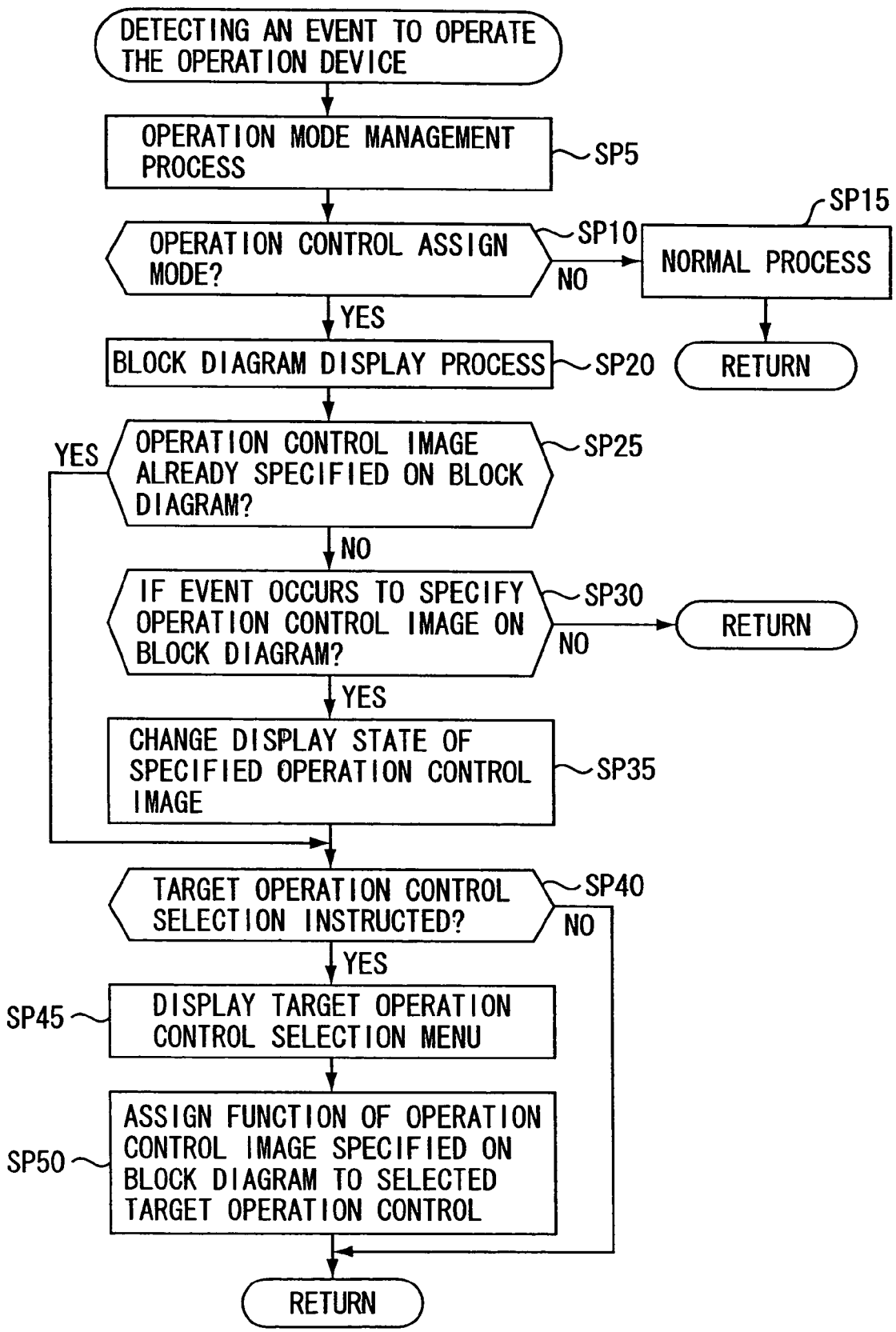
FIG. 4 is a flowchart shoeing the operation of the embodiment.

The following describes operations of the mixing apparatus 100 as the embodiment. Turning on the power sets the operation mode to the normal mode. A routine as shown in FIG. 4 starts in response to an interrupt process each time a user operates the operation controls on the channel strip 110 or the operator strip 120, moves or operates a mouse, or presses the assign switch 130. Let us consider that an operation control on the channel strip 110 is operated.

At step SP5, an operation mode management process is performed. The operation mode management process is differently performed depending on whether or not the assign switch 130 is pressed to start the routine. When pressing the assign switch 130 starts the routine, the assign mode and the normal mode are changed. The modes are unchanged when the other operations start the routine. In this example, the routine starts in response to operation of a control on the channel strip 110. Accordingly, no mode is changed. The normal mode remains to be the current operation mode. The process proceeds to step SP10 to determine whether or not the operation mode is set to the assign mode. It is determined to be "NO" since the operation mode is not set to the assign mode. The process proceeds to step SP15 to perform the normal process. That is, the normal process provides settings for the signal processes such as equalizer adjustment, input level adjustment, and the like, and the mixing process based on operation states of the operation controls on the channel strip 110. The interrupt process then terminates.

Figure 3:
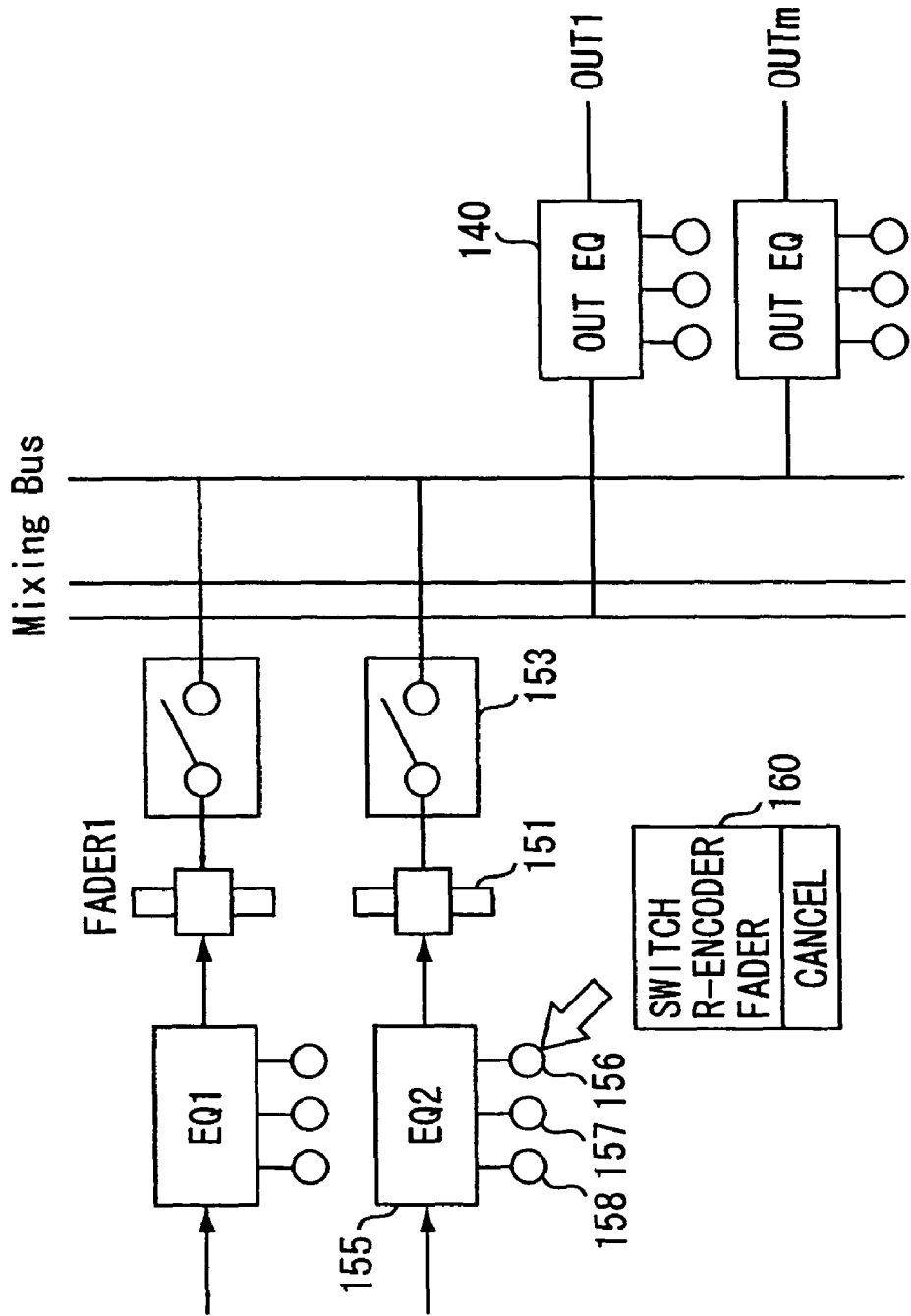
FIG. 3 is a block diagram showing the signal process and mixing process performed in the embodiment.

When the assign switch 130 is pressed, the routine in FIG. 4 restarts. At step SP5, the process changes the mode from the normal mode at the power-on sequence to the assign mode. At step SP10, it is determined to be "YES". The process proceeds to step SP20. At step SP20, the display portion 40 displays a block diagram depicting the process functions and a mouse cursor. Where necessary, the block diagram is scrolled or the screen changes to another. Referring now to FIG. 3, the contents of the block diagram will now be described.

In FIG. 3, reference numeral 151 denotes a fader operation control image and 153 denotes a selector switch operation control image. Reference numeral 155 denotes an equalizer unit image representing the equalizer function. Reference numeral 140 denotes an output equalizer unit image to provide frequency characteristics for an output signal on a mixing bus. The block diagram represents that input signals controlled by the operation controls and the functions are mixed with the other input signals via the mixing bus. The equalizer unit images 155 and 140 are provided with indications of equalizer operation control images 156, 157, and 158 representing HIGH, MID, and LOW.

After displaying the block diagram, the process proceeds to step SP25. It is determined whether or not there is an operation control image already specified on the block diagram. It is determined to be "NO" because no operation control image is specified on the block diagram at the initial execution. The process proceeds to step SP30. At step SP30, it is determined whether or not an event has occurred to specify an operation control image on the block diagram. It is determined whether or not the mouse is left-clicked on the operation control image. It is determined to be "NO" because the mouse is not left-clicked at the initial execution. The interrupt process terminates.

According to the embodiment, operating the operation controls of the operator strip 120 implements part of the process functions displayed by the operation control images. The process functions are partially assigned to the operation controls of the operator strip 120. A user can move the mouse cursor to any operation control image and click on it to specify the operation control image. Subsequently, a right-click operation displays the operation controls (as target operation controls) of the operator strip 120. Further left-click operation selects a target operation control. The following describes processes of specifying an equalizer operation control image 156 by moving and left-clicking the mouse and selecting the rotary encoder 122 of the operator strip 120 as a target operation control.

Moving the mouse restarts the routine shown in FIG. 4. After steps SP5 and SP10, the process proceeds to step SP20 to display movement of the mouse cursor. At step SP30, it is determined to be "NO" unless the mouse is left-clicked. The interrupt process then terminates. Until the mouse movement stops, the routine shown in FIG. 4 repeatedly starts to continuously move the mouse cursor.

Left-clicking the mouse restarts the routine shown in FIG. 4. At step SP30, it is determined to be "NO" when the left click operation is not preceded by moving the mouse cursor to an operation control image. The interrupt process terminates. The mouse is moved again. On the other hand, when the left click operation is preceded by moving the mouse cursor to an operation control image, it is determined to be "YES". The process proceeds to step SP35. At step SP35, the specified operation control image (equalizer operation control image 156) changes the display state to indicate that the operation control image 156 is specified. For example, the specified operation control image changes from light to dark, or vice versa. The process proceeds to step SP40. At step SP40, it is determined whether or not a selection of a target operation control is instructed. That is, it is determined whether or not the mouse is right-clicked on the specified operation control image. In this example, the mouse is left-clicked, not right-clicked. Therefore, it is determined to be "NO". The interrupt process terminates.

The following describes a process to select the target operation control by right-clicking the mouse while the operation control image is specified. Right-clicking the mouse restarts the routine in FIG. 4.

At step SP25, it is determined to be "YES". The process proceeds to step SP40. At step SP40, it is determined to be "YES" when the mouse is right-clicked after the mouse cursor is moved to the operation control image specified at step SP30. The process proceeds to step SP45. At step SP45, a target operation control selection menu is displayed. For example, specifying the equalizer operation control image 156 on the block diagram displays an operation control selection menu 160 (see FIG. 3). The operation control selection menu 160 displays items "Switch", "Rotary encoder", and "Fader" provided on the operator strip 120. When the equalizer operation control image 156 is specified, the "Switch" item is dimmed because the equalizer function enables the rotary encoder or the fader to be selected. Further, the menu displays a "Cancel" item to cancel the setting of the operation control image on the block diagram. The process waits until the mouse is left-clicked to select a target operation control. The following description assumes the "rotary encoder" to be selected as the target operation control.

When the process proceeds to step SP50, the function of the operation control image specified on the block diagram is assigned to the target operation control. Specifically, the equalizer operation control image 156 is specified at step SP30 so as to represent the adjustment of equalizer's high frequencies. Accordingly, the equalizer function is assigned to the target operation control (rotary encoder 122). Further, the color of the operation control image 156 on the block diagram changes to indicate that the equalizer function is assigned. The interrupt process then terminates.

The above-mentioned process is repeated more than once until the operation controls of the operator strip 120 are set to intended functions. When the determination is performed at step SP25, some operation control images are assigned to the target operation controls (operator strip 120) and the others are not. No determination is applied to an operation control image already assigned to the operator strip 120. That is, the determination is performed for an operation control image not assigned to an operation control. It is determined to be "YES" when an operation control image is specified, which does not yet correspond to an operation control of the operator panel. It is determined to be "NO" when an operation control image is not specified on the block diagram. At step SP45, the assigned target operation control item may be dimmed. The operation control corresponding to this item is not assigned to another function unless the specification of the operation control image is canceled. The operation controls on the operator strip may be also assigned to operation control images for the output equalizer.

When the target operation control setting is complete, an operator re-presses the assign switch 130. In response to this, the routine shown in FIG. 4 restarts.

At step SP5, pressing the assign switch changes the operation mode to the normal mode. The assign switch 130 turns off. Accordingly, it is determined to be "NO" at step SP10. The process proceeds to step SP15 to perform the normal process. When the assign mode changes to the normal mode, however, nothing is processed. The interrupt process terminates.

Further, operating the channel strip 110 or an operation control of the operator strip 120 restarts the routine shown in FIG. 4. At step SP10, it is again determined to be "NO" to perform the normal process. That is, the signal process and the mixing process are set based on the new operation state of the operation control of the channel strip 110 or the operator strip 120. The interrupt process then terminates. Specifically, when the equalizer operation control image 156 is assigned to the rotary encoder 122, setting of the rotary encoder 122 adjusts the equalizer's high frequency. The high frequency is mixed with the other input signals and is output via an output equalizer unit image 140.

According to the embodiment, as mentioned above, even a beginner can easily set functions of the operator strip controls only if he or she can understand the functions in the block diagram. This makes it possible to use one operation control for a plurality of functions depending on usage situations and facilitate mixing operations. Further, there may be a case of operating a mixing apparatus having a large operation panel that includes a channel strip operation control located in a position hard to reach. In such case, it is possible to assign the function of the hard-to-reach operation control to an operator strip control located in a position easy to reach or touch.

3. Modifications

The present invention is not limited to the above-mentioned embodiment and may be modified as follows, for example.

(1) According to the above-mentioned embodiment, the operator strip 120 is provided on the mixing apparatus body. Further, the operator strip may be separated from the body and may be used to remotely control the mixing operation.

(2) According to the above-mentioned embodiment, the display portion 40 uses the block diagram to display the mixer functions. In addition, unique numbers, characters, or symbols may be given to the switches and the like in the block diagram described in an instruction manual. The corresponding number, character, or symbol may be entered from the mixing apparatus so as to assign the switches and the like on the block diagram to the operator strip controls. Also in this case, the number, character, or symbol can be entered by simultaneously using the block diagram displayed on the display (liquid crystal panel). Accordingly, even on a large block diagram, the screen can be moved near an intended operation control image, facilitating the specification of operation control images.

(3) According to the above-mentioned embodiment, the operator strip 120 is constructed as hardware. Further, the operator strip can be displayed also on the screen as a graphic user interface. This makes it possible to directly operate the operator strip controls corresponding to the operation control images specified on the block diagram. The program stored in the ROM 70 can be distributed by saving the program on machine readable storage media such as CD-ROM, flexible disks, and the like, or via electrical communication lines.

What is claimed is:

1. A method of setting a function to a physical operation control provided in an operator strip of a panel of an audio mixing apparatus having a plurality of input channels for processing and mixing a plurality of input signals, the method comprising:
- a display step to display a block diagram that depicts functions of each of the plurality of the input channels of the audio mixing apparatus;
- a selection step to select a specific function out of the functions depicted in the block diagram of the input channel;
- another display step to display a plurality of physical operation controls of various types provided in the operator strip of the panel of the audio mixing apparatus;
- another selection step to select one physical operation control from the plurality of the displayed physical operation controls; and
- an assignment step to assign the selected specific function depicted in the block diagram of the input channel to the selected physical operation control in the operator strip of the panel of the audio mixing apparatus.

2. A setting apparatus for assigning a function to a physical operation control provided in an operator strip of a panel of an audio mixing apparatus having a plurality of input channels for processing and mixing a plurality of input signals, the setting apparatus comprising:
- a first display device that displays a block diagram depicting functions of each of the plurality of the input channels of the audio mixing apparatus;
- a first selection device that selects a specific function out of the functions depicted in the block diagram of the input channel;
- a second display device that displays a plurality of physical operation controls of various types provided in the operator strip of the panel of the audio mixing apparatus;
- a second selection device that selects one physical operation control from the plurality of the displayed physical operation controls; and
- an assignment device that assigns the selected specific function depicted in the block diagram of the input channel to the selected physical operation control in the operator strip of the panel of the audio mixing apparatus.

3. A computer readable storage media for use in an audio mixing apparatus having a processor for processing or mixing a plurality of input signals through a plurality of channels, the media containing program instructions executable by the processor for causing the audio mixing apparatus to perform a method of setting a function to a physical operation control provided in an operator strip of a panel of the audio mixing apparatus, the method comprising:
- a display step to display a block diagram that depicts functions of each of the plurality of the input channels of the audio mixing apparatus;
- a selection step to select a specific function out of the functions depicted in the block diagram of the input channel;
- another display step to display a plurality of physical operation controls of various types provided in the operator strip of the panel of the audio mixing apparatus;
- another selection step to select one physical operation control from the plurality of the displayed physical operation controls; and
- an assignment step to assign the selected specific function depicted in the block diagram of the input channel to the selected physical operation control in the operator strip of the panel of the audio mixing apparatus.

* * * * *